(12) United States Patent
Peuhkurinen et al.

(10) Patent No.: US 12,532,005 B2
(45) Date of Patent: *Jan. 20, 2026

(54) IMAGE ENCODING BASED ON ALPHA CHANNEL

(71) Applicant: Varjo Technologies Oy, Helsinki (FI)

(72) Inventors: Ari Antti Erik Peuhkurinen, Helsinki (FI); Timo Suoranta, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 441 days.

This patent is subject to a terminal disclaimer.

(21) Appl. No.: 18/146,403

(22) Filed: Dec. 26, 2022

(65) Prior Publication Data

US 2024/0214588 A1    Jun. 27, 2024

(51) Int. Cl.
*H04N 19/186* (2014.01)
*H04N 19/119* (2014.01)
*H04N 19/176* (2014.01)

(52) U.S. Cl.
CPC ......... *H04N 19/186* (2014.11); *H04N 19/119* (2014.11); *H04N 19/176* (2014.11)

(58) Field of Classification Search
CPC .. H04N 19/186; H04N 19/119; H04N 19/176; H04N 19/167; H04N 19/21; H04N 19/597; H04N 19/105; H04N 19/10; H04N 19/102; H04N 19/134; H04N 19/136; H04N 19/172; H04N 19/174; H04N 19/182; H04N 19/1883; H04N 19/192; H04N 19/194; H04N 19/197; H04N 19/30; H04N 19/31; H04N 19/33; H04N 19/39; H04N 19/46; H04N 19/50; H04N 19/503; H04N 19/507; H04N 19/573; H04N 19/58; H04N 19/583; H04N 19/96; H04N 19/90; G06T 9/40; G06T 3/40; G06T 3/60; G06T 9/004; G06T 2207/30244; G06T 7/97; G06T 15/503; G06T 2210/62; G06F 2203/04804
See application file for complete search history.

(56) References Cited

U.S. PATENT DOCUMENTS

| | | | | |
|---|---|---|---|---|
| 6,188,796 B1 * | 2/2001 | Kadono | ............... | H04N 19/543 375/E7.263 |
| 10,311,833 B1 * | 6/2019 | Qiu | ............... | G09G 5/003 |
| 2006/0029134 A1 * | 2/2006 | Winder | ............... | H04N 19/96 375/E7.199 |
| 2006/0269127 A1 * | 11/2006 | Ogden | ............... | H04N 1/644 375/E7.185 |
| 2008/0002896 A1 * | 1/2008 | Lu | ............... | G06T 9/005 382/232 |

(Continued)

*Primary Examiner* — Matthew C Bella
*Assistant Examiner* — Nicholas John Helco
(74) *Attorney, Agent, or Firm* — Ziegler IP Law Group, LLC (57) ABSTRACT

Disclosed is an encoder for encoding images, the encoder having a processor configured to obtain colour data of colour channels of a given image and alpha data of an alpha channel of the given image; identify at least one portion of the given image whose alpha values are zero or less than a predefined threshold value, wherein a zero alpha value indicates full transparency; divide a remaining portion of the given image into blocks, wherein the colour data and the alpha data of the remaining portion are divided into their own respective blocks; and encode the blocks into encoded data.

19 Claims, 3 Drawing Sheets

(56) References Cited

U.S. PATENT DOCUMENTS

| | | | |
|---|---|---|---|
| 2008/0055331 A1* | 3/2008 | Lourcha | H04N 19/176 |
| | | | 375/E7.176 |
| 2008/0291295 A1* | 11/2008 | Kato | H04N 19/17 |
| | | | 382/254 |
| 2016/0063330 A1* | 3/2016 | Xu | G06T 7/73 |
| | | | 382/103 |
| 2017/0025098 A1* | 1/2017 | Keramidas | H04N 19/176 |
| 2018/0232865 A1* | 8/2018 | Chiba | G06T 7/90 |
| 2019/0289322 A1* | 9/2019 | Abbas | H04N 19/46 |
| 2023/0082705 A1* | 3/2023 | Trepte | G06T 15/04 |
| | | | 345/419 |
| 2023/0370600 A1* | 11/2023 | Varekamp | H04N 19/119 |
| 2024/0119638 A1* | 4/2024 | Taudul | G06T 9/20 |
| 2024/0212213 A1* | 6/2024 | Peuhkurinen | G06T 7/74 |
| 2024/0212222 A1* | 6/2024 | Peuhkurinen | G06T 3/40 |

\* cited by examiner

IMAGE ENCODING BASED ON ALPHA CHANNEL

TECHNICAL FIELD

The present disclosure relates to encoders for encoding images. The present disclosure also relates to methods for encoding images.

BACKGROUND

Encoding is popularly used as a technique for compressing images in order to reduce their size, to transmit the images in a bandwidth-efficient manner across a communication network, to process and load the images in less time, and the like. The process of encoding the images is performed by encoders. The encoders employ compression techniques, for example, such as H.264, H.265, H.266, AOMedia Video 1 (AV1), VP9, and the like, for encoding the images. However, conventional encoders possess certain limitations.

Firstly, the conventional encoders do not have an interface having suitable sample and texture formats for correlating smaller datasets of different types of data of the images. For example, the conventional encoders do not have suitable sample and texture formats to correlate colour data (for example, such as Red-Green-Blue (RGB) data) and alpha data of the image to create a whole frame data set from these different types of data. As a result, an amount of processing required for encoding the images is quite high as each type of data of the image is encoded separately. This also results in a high processing time and more burden on computing resources while encoding the images. Secondly, the conventional encoders are unable to understand characteristics of the alpha data for optimizing encoding of colour data and/or other types of data. This leads to inefficient and inaccurate encoding of the colour data and/or the other types of data, which is undesirable. Thirdly, correlation of data of different images corresponding to a left eye and a right eye of a user is also not feasible using the conventional encoders. Fourthly, the conventional encoders are unsuitable to be used for processing data in formats of different coordinate systems, except for processing data in a format of a Cartesian coordinate system.

Therefore, in light of the foregoing discussion, there exists a need to overcome the aforementioned drawbacks associated with conventional encoders.

SUMMARY

The present disclosure seeks to provide an encoder for encoding images. The present disclosure also seeks to provide a method of encoding images. An aim of the present disclosure is to provide a solution that overcomes at least partially the problems encountered in prior art.

In one aspect, an embodiment of the present disclosure provides an encoder for encoding images, the encoder comprising a processor configured to:
  obtain colour data of colour channels of a given image and alpha data of an alpha channel of the given image;
  identify at least one portion of the given image whose alpha values are zero or less than a predefined threshold value, wherein a zero alpha value indicates full transparency;
  divide a remaining portion of the given image into blocks, wherein the colour data and the alpha data of the remaining portion are divided into their own respective blocks; and
  encode the blocks into encoded data.

In another aspect, an embodiment of the present disclosure provides a method of encoding images, the method comprising:
  obtaining colour data of colour channels of a given image and alpha data of an alpha channel of the given image;
  identifying at least one portion of the given image whose alpha values are zero or less than a predefined threshold value, wherein a zero alpha value indicates full transparency;
  dividing a remaining portion of the given image into blocks, wherein the colour data and the alpha data of the remaining portion are divided into their own respective blocks; and
  encoding the blocks into encoded data.

Embodiments of the present disclosure substantially eliminate or at least partially address the aforementioned problems in the prior art, and enable fast and efficient encoding of the given image by ignoring the colour data and the alpha data of the at least one portion of the given image whose alpha values are zero or near zero.

Additional aspects, advantages, features and objects of the present disclosure would be made apparent from the drawings and the detailed description of the illustrative embodiments construed in conjunction with the appended claims that follow. It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3B illustrates a portion of the given image whose alpha values are zero or less than a predefined threshold value and a remaining portion of the given image, whose colour data is divided into blocks, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an encoder for encoding images, the encoder comprising a processor configured to:
  obtain colour data of colour channels of a given image and alpha data of an alpha channel of the given image;
  identify at least one portion of the given image whose alpha values are zero or less than a predefined threshold value, wherein a zero alpha value indicates full transparency;
  divide a remaining portion of the given image into blocks, wherein the colour data and the alpha data of the remaining portion are divided into their own respective blocks; and
  encode the blocks into encoded data.

In another aspect, an embodiment of the present disclosure provides a method of encoding images, the method comprising:
  obtaining colour data of colour channels of a given image and alpha data of an alpha channel of the given image;
  identifying at least one portion of the given image whose alpha values are zero or less than a predefined threshold value, wherein a zero alpha value indicates full transparency;
  dividing a remaining portion of the given image into blocks, wherein the colour data and the alpha data of the remaining portion are divided into their own respective blocks; and
  encoding the blocks into encoded data.

The present disclosure provides the aforementioned encoder for encoding images and the method of encoding images. The encoder beneficially utilizes multiple channels, namely the colour channels and the alpha channel of the given image to encode the given image, resulting in improved quality of the encoded data. Moreover, the encoder uses the alpha data as a reference to optimize encoding of both the colour data and the alpha data. In this regard, the encoder ignores (namely, leaves out) the at least one portion of the given image whose alpha values are zero or near-zero, and divides the colour data and the alpha data of only the remaining portion of the given image into the blocks, which are then encoded into the encoded data. This results in significantly reduced amount of the data to be processed, thereby significantly reducing processing time, resulting in fast and efficient encoding, while imparting less load on computing resources. Furthermore, such synergistic utilization of the alpha data for encoding both the colour data and the alpha data of the given image results in significantly enhanced accuracy of the encoded data of the given image and results in minimum or nil loss while encoding the given image. Beneficially, the method is easy to implement and provides fast results.

Pursuant to the present disclosure, the at least one portion of the given image is neither divided into blocks, nor encoded into the encoded data. Pixels of the given image having alpha values equal to zero or less than the predefined threshold value represent a portion of the given image that is fully transparent or almost transparent (such that it is not perceivable by a user). Owing to the transparency, said portion of the given image will not be visible when the given image is displayed. Hence, said portion of the given image can be safely ignored, and there is no need to encode said portion of the given image into the encoded data.

Herein, the term "encoder" refers to specialized equipment that, in operation, encodes images. The encoder encodes the given image into the encoded data having a comparatively smaller size than a size of the given image. Encoding of the given image is performed to compress the given image, so as to enable in efficient storage of the given image (for example, in a data repository), efficient transfer of the given image to a decoder, and the like.

Throughout the present disclosure, the term "colour channel" of the given image refers to a component of the given image in which the colour data of the given image is stored. The colour data includes colour values for each pixel in the given image. The given image may have a single colour channel (for example, when the given image is a monochrome image) or multiple colour channels (for example, when the given image is a polychrome image). The multiple colour channels may store the colour data of the given image in any format. Examples of such a format include, but are not limited to, a Red-Green-Blue (RGB) format, a Red-Green-Blue-White (RGBW) format, a Red-Yellow-Yellow-Blue (RYYB) format, a Red-Green-Green-Blue (RGGB) format, a luminance-blue projection-red projection (YUV) format, and a grayscale format. For example, the given image can have three colour channels—a red colour channel, a green colour channel, and a blue colour channel, wherein the colour data includes colour values in a 24-bit format (i.e., 8-bit values per colour channel). As an example, a colour value of a given pixel may be (64,224,208), which indicates that the given pixel has turquoise colour.

The term "alpha channel" of the given image refers to a component of the given image in which the alpha data (representative of transparency or opacity of pixels) of the given image is stored. The alpha data includes alpha values for each pixel in the given image. The alpha channel may store the alpha values of the given image in a suitable format. The alpha values could range from 0 to 255 in a 8-bit format, which indicates 256 levels from fully transparent (i.e., alpha value of 0) to fully opaque (i.e., alpha value of 255). As an example, an alpha value of a given pixel may be 100, which indicates a transparency of approximately 40 percent. Alternatively, the alpha values could range from 0 to 10 in a 4-bit format. As an example, an alpha value of a given pixel may be 8 (from within a range of 0-10), which indicates opacity of approximately 80 percent. It will be appreciated that other formats and ranges for alpha channel values are also feasible. For example, the alpha values may range from 0 to 1, wherein 0 represents fully transparent, while 1 represents fully opaque. The alpha values could be used for blending images, or for making at least a part of an image transparent. It will be appreciated that the alpha values could also be represented in an inverse manner, wherein a lower value would mean more opaque (and less transparent), and thus, in such a case, the at least one portion that has alpha values higher than a second predefined threshold value would be ignored (namely, left out). It will also be appreciated that the alpha values could be represented in a non-linear manner. Moreover, the format for representing the alpha values may depend on a dynamic range of the alpha values. As an example, the alpha values may be represented using a 16-float format.

Optionally, the processor is configured to obtain other data of at least one other channel of the given image, the at least one other channel comprising at least one of: a depth channel, a velocity channel, a surface normal channel, an object identifier channel, a material identifier channel, a specular channel of the given image, wherein the other data of the remaining portion is divided into its own respective blocks. In such a case, the blocks of the other data are also encoded into the encoded data.

The term "depth channel" refers to a component of the given image in which depth data of the given image is stored. The depth data includes depth values for each pixel in the given image, wherein depth value of a pixel is indicative of a distance between a 3D point (on an object) represented by said pixel from a given position (for example, from a position of a camera that captured the given image, from a reference 30 position used by a device that generated the given image, or similar). The depth channel may store the depth data of the given image in a single format. The depth data can be represented as a grayscale image. As an example, a 3D point on an object may be near to a camera, therefore, a pixel representing said 3D point on the object in the given image may appear light grey and another 3D point on another object may be far from the camera, therefore, a pixel representing the another 3D point in the given image may appear darker.

The term "velocity channel" refers to a component of the given image in which velocity data of the given image is stored. The velocity data includes velocity vectors for each pixel or each group of pixels in the given image. When a pixel represents a stationary object or a stationary portion of an object, a velocity vector of said pixel is zero. When a pixel represents a moving object or a moving portion of an object, a velocity vector of said pixel is non-zero. A velocity vector is indicative of a speed and a direction of movement of a pixel. The velocity channel may store the velocity data of the given image in a single format.

The term "surface normal channel" refers to a component of the given image in which surface normal vectors of the given image are stored. The surface normal vectors convey geometry information of objects or their portions that are represented in the given image.

The term "object identifier channel" refers to a component of the given image in which identifiers of objects represented in the given image are stored. Each pixel of the given image is tagged with identifiers of one or more objects that it represents. The identifiers of objects could have any form, alphabetic, numeric, alphanumeric, symbolic, and the like.

The term "material identifier channel" refers to a component of the given image in which identifiers of materials of objects represented in the given image are stored. Each pixel of the given image is tagged with identifiers of one or more materials from which object(s) (that it represents) are made. The identifiers of the materials of objects could have any form, alphabetic, numeric, alphanumeric, symbolic, and the like.

The term "specular channel" refers to a component of the given image in which reflectivity data of the given image is stored. The reflectivity data includes reflectivity values of each pixel in the given image, wherein reflectivity value of each pixel is indicative of how reflective a 3D point on an object (represented in the given image) is.

The given image could be obtained by the processor from an image source. Examples of the image source include, but are not limited to, a data repository, a cloud server, and a camera. In such a case, the image source is communicably coupled to the encoder. Alternatively, the given image could be generated by the processor itself.

At an input interface of the encoder, the colour data and the alpha data of the given image could be obtained in an interleaved manner. Alternatively, the colour data and the alpha data of the given image could be obtained as separate data blobs. Moreover, the colour data and the alpha data of the given image could be received in parts. Owing to obtainment of the colour data and the alpha data at the input interface in parts, encoding of the given image is implemented time-efficiently because it is not required to wait for all the data to encode the given image wholly at once, and the given image could be encoded in parts, thus a latency between generation of the encoded data and transfer (for example, streaming) of the encoded data for subsequent decoding is reduced. As an example, the colour data and the alpha data of select pixels, or select rays, or select ray sets may be sent at a time. As another example, the colour data and the alpha data of a gaze-contingent region of the given image may be sent prior to sending the colour data and the alpha data of a remaining region of the given image. As yet another example, the colour data and the alpha data of images for left and right eyes may be sent one after another.

In an implementation, the alpha values of pixels may lie in a range of 0-1. In such a case, an alpha value of 0 indicates fully transparent, and an alpha value of 1 indicates fully opaque. The aforesaid values determine transparency of pixels in the given image. Higher alpha values indicate more opacity (i.e., less transparency) and lower alpha values indicate more transparency (i.e., less opacity).

Notably, in the given image, the at least one portion of the given image in which alpha values of pixels are equal to zero or less then the predefined threshold value is identified. Optionally, for alpha values ranging from 0 to 1, the predefined threshold value lies in a range of 0 to 0.1. In this regard, the predefined threshold value of 0.1 indicates transparency of approximately 90 percent. More optionally, the predefined threshold value lies in a range of 0 to 0.05. Yet more optionally, the predefined threshold value lies in a range of 0 to 0.02. Likewise, for alpha values ranging from 0 to 10, the predefined threshold value could lie in a range of 0 to 1. It will be appreciated that the predefined threshold value depends on the dynamic range of the alpha values. In this regard, the predefined threshold value could be determined as a predefined percentage of the dynamic range of the alpha values. The predefined percentage could lie in a range from 0 to 10 percent.

The at least one portion could include a single portion or multiple portions of the given. As an example, a given image may have a size equal to 500*500 pixels, wherein the alpha values lie in a range of 0 to 1, and the predefined threshold value is 0.05. In the given image, a portion having a size equal to 150*150 pixels may have alpha values equal to zero or less than 0.05, thus said portion would be considered as the at least one portion. Advantageously, a portion of the given image having high level of transparencies (for example, between 90 percent to 100 percent of transparency) can be accurately identified and be excluded from processing, thereby significantly reducing the amount of data to be processed and therefore the processing time required for encoding the given image.

Throughout the present disclosure, the term "remaining portion" is a portion of the given image that is encoded by the encoder. The alpha values of pixels in the remaining portion are greater than the predefined threshold value. In other words, the remaining portion is a portion of the given image that is opaque or is less transparent.

Throughout the present disclosure, the term "block" refers to a portion of a given image, namely a set of neighbouring pixels in the given image which can be processed together during encoding. A number of blocks into which the given image is divided may be fixed (and optionally, predefined) or may be dynamic. Optionally, when dividing the given image into the blocks, the processor is configured to employ a block coding technique. It will be appreciated that other techniques of dividing the given image into the blocks are well within the scope of the present disclosure. In the block coding technique, the remaining portion of the given image (in which the alpha values are not zero or less than the predefined threshold value) is divided into blocks which may have same sizes or may have different sizes. As an example, the sizes of the blocks may be 16*16 pixels, 30*30 pixels, 60*90 pixels, 30*120 pixels, 128*128 pixels, and the like. It will be appreciated that entire processing as disclosed in the present disclosure is performed on the "blocks" into which the remaining portion of the given image is divided.

It will be appreciated that the manner in which the colour data is divided into its own blocks may be same as or may be different from a manner in which the alpha data is divided into its own blocks. The division of the colour data and the alpha data into their respective blocks is described below in further detail.

Optionally, when dividing, the processor is configured to determine how the colour data of the remaining portion is to be divided into its respective blocks, based on how the alpha data of the remaining portion is divided into its respective blocks. Additionally, optionally, the other data of the remaining portion is also divided based on how the alpha data is divided. In this regard, a manner of division of the alpha data is used as a frame of reference for dividing the colour data and, optionally, the other data. Dividing the colour data (and optionally the other data) based on the division of the alpha data reduces a processing requirement of the encoder, whilst still accurately capturing variations in the colour data (and the other data) to a certain extent. Thus, division of the colour data (and optionally, the other data) of the remaining portion is performed in a time-efficient manner, whilst reducing a burden on the computing resources.

Optionally, the colour data of the given image (and optionally, the other data) is divided into its respective blocks in a similar manner as the division of the alpha data into its respective blocks. This "similarity" of the manner of division is in terms of sizes of the blocks and/or an arrangement of the blocks. Notably, sizes and/or an arrangement of the respective blocks of the colour data may exactly correspond to the respective blocks of the alpha data or may partially correspond to the respective blocks of the alpha data. Optionally, the respective blocks of the colour data are understood to be divided in the similar manner as the respective blocks of the alpha data when the sizes and/or the arrangement of said blocks are at least 50 percent similar. Advantageously, the technical effect of determining how the colour data of the given image is to be divided based on how the alpha data is divided is that corresponding blocks of the colour data and the alpha data can be grouped together accurately during encoding, thereby resulting in simple and efficient encoding of the given image. Moreover, a decision as to how to divide the colour data (and optionally, the other data) is not required to be made separately, as the manner in which the alpha data is divided is already known.

As one example, the given may have a size equal to 500*500 pixels. The alpha data of the alpha channel of the given image may be divided into four blocks, each block having a size equal to 250*250 pixels and the colour data of colour channels may be divided into three blocks may have size equal to 250*250 pixels each, one block having a size equal to 150*150 pixels and four other blocks having a size equal to 100*100 pixels. In said example, the blocks of the alpha data and the blocks of the colour data can be considered to be divided in 75 percent similar manner.

Optionally, the given image is divided into the blocks in a hierarchical manner, based on at least one of:
 a dynamic range of at least one of: the colour values, the alpha values in the blocks,
 a manner in which at least one of: colour values, alpha values change in the blocks.

In this regard, the term "hierarchical manner" refers to a manner of division of the given image into multiple levels. In the hierarchical manner of division, the given image is initially divided into a plurality of blocks and one or more blocks from amongst the plurality of blocks are further sub-divided into blocks having smaller sizes. Optionally, in this regard, the given image is divided iteratively. Optionally, the given image is divided into the blocks in the hierarchical manner using at least one of: a quadtree algorithm, a binary tree algorithm, a ternary tree algorithm, a triangle-based algorithm, a K-Dimensional (K-D) tree algorithm.

In one implementation, the given image is divided into the blocks in the hierarchical manner based on the dynamic range of the at least one of: the colour values, the alpha values in the blocks. Optionally, in this regard, larger the dynamic range of the at least one of: the colour values, the alpha values in a given region of the remaining portion of the given image, higher is a number of hierarchical divisions performed on the given region of the remaining portion of the given image. A high number of divisions are performed in case of a large dynamic range in the given region to ensure that a high number of blocks are formed for adequately and accurately describing the large dynamic range of the at least one of: the colour values, the alpha values (i.e., high frequency of the at least one of: the colour values, the alpha values in the given region). When change of the at least one of: the colour values, the alpha values in the given region is high, it means that the given region has high frequency of data values. Subsequent encoding and decoding of such blocks can be beneficially performed with nil or minimal losses. Conversely, fewer divisions are performed when the dynamic range of data represented in the blocks is small. As an example, a given image may have two regions, one region having a large dynamic range and another region having a small dynamic range. In said example, the region having the large dynamic range may beneficially have more blocks than the region having small dynamic range.

In another implementation, the given image is divided into the blocks in the hierarchical manner based on the manner in which the at least one of: the colour values, the alpha values change in the blocks. The manner in which the at least one of: the colour values, the alpha values change in the blocks is indicative of characteristics of the blocks (i.e., how alpha values and/or colour values change in the blocks). The at least one of: the colour values, the alpha values may change in a linear, non-linear, or step-wise manner. The at least one of: the colour values, the alpha values may change abruptly or gradually. The at least one of: the colour values, the alpha values may change randomly, along a given direction, or in a given pattern. For example, alpha values of pixels may change abruptly in a given direction, thereby indicating a boundary of an object. Advantageously, the given image is divided into multiple blocks to enable in sufficient capturing (in the encoded data) of the change in the at least one of: the colour values, the alpha values of the given block, resulting in efficient and accurate encoding of the given image.

As an example, an image may have a size equal to 900*900 pixels. Herein, the alpha data of the alpha channel of the image may be initially divided into four blocks A, B, C and D, each block having a size equal to 450*450 pixels. The manner in which the alpha values change in each of the four blocks A-D may be analysed for dividing the given image in the hierarchical manner. If the alpha values in the blocks A and D are found to be unchanged or have minimal change, the alpha values are considered to be uniform, and therefore, the blocks A and D may not be divided further. If the alpha values in the block B are found to be changing in a linear manner, the alpha values are considered to be non-uniform and, therefore, the block B may be further divided into four blocks B1, B2, B3 and B4, each having a size equal to 225*225 pixels. Similarly, if the alpha values in the block C are found to be changing in a non-linear manner, the alpha values are considered to be non-uniform and therefore, the block C may be further divided into four blocks C1, C2, C3 and C4, each having a size equal to 225*225 pixels. Moreover, if the alpha values in any one of the blocks B1-B4 and C1-C4 are also found to be changing in a non-linear manner, the alpha values are considered to be non-uniform, and therefore, such a block may be further divided into smaller blocks in an iterative manner. In this example, the colour data of the colour channels may be divided in a similar manner.

In yet another implementation, the given image is divided into the blocks in the hierarchical manner, based on the dynamic range and the manner in which the at least one of: the colour values, the alpha values change in the blocks.

Optionally, the blocks of the colour data and the blocks of the alpha data are at a same level of division depth. Herein, the term "division depth" refers to a number of times the given image is divided hierarchically to obtain the blocks of a given data. A high division depth is indicative of a deep hierarchy having a high number of sub-divisions, and vice versa. When the blocks of the colour data and the blocks of the alpha data are at the same level of division depth, it means that a size of a smallest block in the blocks of the colour data and a size of a smallest block in the blocks of the alpha data is same. In this case, the colour data and the alpha data share a block division structure fully. For example, the alpha data of the given image may be divided into six blocks A, B, C, D, E and F each having equal sizes. The aforesaid blocks may be considered to be at a first level of division depth. Amongst the six blocks A-F, the blocks A and C may be further divided into four blocks each as blocks A1, A2, A3, A4, and blocks C1, C2, C3 and C4, respectively. The blocks A1-A4 and C1-C4 are at a second level of division depth. Further, the blocks A1 and C1 may be divided into two blocks each as blocks A11 and A12, and C11 and C12, respectively. The blocks A11, A12, C11 and C12 are at a third level of division depth. In said example, the alpha data is divided down to three levels of division depth. The colour data may also be divided down to three levels of division depth, in a same manner or in a different manner. Advantageously, the technical effect of the same level of the division depth is that it results in division of the colour data and the alpha data of the given image into the blocks in a time-efficient manner, thereby, significantly reducing processing time. This is particularly beneficial in a case where a decision as to how to divide one of the colour data and the alpha data is also utilised to divide another of the colour data and the alpha data. In other words, the division of the colour data and the alpha data could be performed based on the aforesaid analysis of only one of the colour data and the alpha data (namely, based on the at least one of: the dynamic range of data represented in the blocks, the manner in which data values change in the blocks).

Alternatively, optionally, when dividing, the processor is configured to:
  initially divide the colour data and the alpha data into respective blocks at a same level of division depth; and
  further divide at least one block of the colour data into smaller blocks, based on a dynamic range of colour values in the at least one block of the colour data.

The same level of division depth up to which the initial division of the colour data and the alpha data is performed can be determined for example, based on the aforesaid analysis of only one of the colour data and the alpha data (namely, the dynamic range of at least one of: the colour values, the alpha values in the blocks, the manner in which at least one of: colour values, alpha values change in the blocks). Optionally, upon dividing the colour data and the alpha data into their respective blocks, the at least one block of the colour data is further analysed to determine an amount of change in the colour values and/or a manner of the change in the colour values in the at least one block. Optionally, the at least one block of the colour data is divided further iteratively. When the colour values in the at least one block is found to change, for example, abruptly or non-linearly, the at least one block of the colour data is divided further to capture the change accurately and adequately while encoding the at least one block. In this regard, the at least block of the colour data may have high frequency of the colour values than a corresponding block of the alpha data.

In an example, the colour data and the alpha data of the given image may be divided at a first level of division depth into three blocks, P, Q, R and three blocks L, M, N, respectively. Next, each of the blocks P, Q, R and the blocks L, M, N of the colour data and the alpha data, respectively are further analysed, wherein if the blocks P and M are found to have changes in the colour values and alpha values, respectively, the block P may be divided further into three blocks, P1, P2, P3, while the block M may be divided further into three blocks M1, M2 and M3. Next, if the block P1 is found to have changes in the colour values, the block P1 may be divided further into two blocks, P11 and P12. In said example, the colour data and the alpha data are initially divided down to equal division depth, which is two levels, and further the colour data is sub-divided down to one more level. Advantageously, the technical effect of further dividing the at least one block of the colour data into the smaller blocks is that the change in the colour values can be adequately captured leading to accurate encoding of the given image. The technical benefit of initially dividing the colour data and the alpha data to the same division depth is that a decision as to how to divide one of the colour data and the alpha data can also be utilised to divide another of the colour data and the alpha data. In other words, the initial division of the colour data and the alpha data could be performed based on the aforesaid analysis of only one of the colour data and the alpha data (namely, the dynamic range of at least one of: the colour values, the alpha values in the blocks, the manner in which at least one of: colour values, alpha values change in the blocks). The technical benefit of further dividing the at least one block of the colour data into smaller blocks is that the colour data is divided according to the dynamic range of the colour data, thereby leading to a more efficient encoding of the colour data.

Optionally, when dividing, the processor is configured to:
initially divide the colour data and the alpha data into respective blocks at a same level of division depth; and
further divide at least one block of the alpha data into smaller blocks, based on a dynamic range of alpha values in the at least one block of the alpha data.

Optionally, in this regard, upon dividing the colour data and the alpha data into their respective blocks, the at least one block of the alpha data is further analysed to determine an amount of change in the alpha values and/or a manner of the change in the alpha values in the at least one block. Optionally, the at least one block of the alpha data is divided further iteratively. When the alpha values in the at least one block is found to change, for example, abruptly or non-linearly, the at least one block of the alpha data is divided further to capture the change accurately and adequately while encoding the at least one block. In this regard, the at least block of the alpha data may have high frequency of the colour values than a corresponding block of the colour data.

In an example, the colour data and the alpha data of the given image may be divided at a first level of division depth into three blocks, X, Y, Z and three blocks U, V, W, respectively. Next, each of the blocks X, Y, Z and the blocks U, V, W of the colour data and the alpha data, respectively are further analysed, wherein if the block X and U are found to have changes in the colour values and alpha values, respectively, the block P may be divided further into three blocks, X1, X2, X3, while the block U may be divided further into three blocks U1, U2 and U3. Next, if the block U1 is found to have changes in the alpha values, the block U1 may be divided further into two blocks, U11 and U12. In said example, the colour data and the alpha data are divided down to equal division depth, which is two levels, and further the alpha data is sub-divided down to one more level. Advantageously, the technical effect of further dividing the alpha data into the smaller blocks is that the change in the alpha values can be adequately captured leading to accurate encoding of the given image. The technical benefit of initially dividing the colour data and the alpha data to the same division depth is that a decision as to how to divide one of the colour data and the alpha data can also be utilised to divide another of the colour data and the alpha data. In other words, the initial division of the colour data and the alpha data could be performed based on the aforesaid analysis of only one of the colour data and the alpha data (namely, the dynamic range of at least one of: the colour values, the alpha values in the blocks, the manner in which at least one of: colour values, alpha values change in the blocks). The technical benefit of further dividing the at least one block of the alpha data into smaller blocks is that said alpha data is divided according to the dynamic range of the alpha data, thereby leading to a more efficient encoding of the alpha data.

It will be appreciated that the at least one block of the colour data and the at least one block of the alpha data could be located at different regions of the given image. As an example, the given image may have a size equal to 500*500 pixels. The colour data is divided into four blocks, namely P, Q, R, S and the alpha data is correspondingly divided into four blocks, namely, A, B, C, D, each having a size equal to 250*250 pixels. Next, upon analysing it is found that the block P of the colour data may have high frequency of the colour values as compared to the corresponding block A of the alpha data, and the block C of the alpha data may have high frequency of the alpha values as compared to the corresponding block R of the colour data. Thus, the block P of the colour data and the block C of the alpha data may be divided further into the smaller blocks.

Throughout the present disclosure, the term "encoded data" refers to data that is generated upon encoding the blocks of the colour data and the alpha data of the given image. The encoded data requires less storage and/or transmission resources as compared to the colour data and the alpha data of the given image. Optionally, a given block of the colour data and a corresponding block of the alpha data are encoded together into the encoded data. In other words, the given block of the colour data and the corresponding block of the alpha data are bundled and encoded together. Optionally, the encoded data is sent by the encoder to a decoder, via a communication network. The decoder, in use, decodes the encoded data to generate a given decoded image, the given decoded image being a re-creation of the given image. Advantageously, the technical effect of bundling and encoding of corresponding blocks of different types of data allows for correlating between the different types of data (namely, the alpha data, the colour data, and optionally, the other data) for accurately decoding the encoded data to recreate the given image with nil or minimal loss.

In some implementations, the colour data and the alpha data are in a Cartesian format. In other implementations, the colour data and the alpha data are in a non-Cartesian format. Examples of the non-Cartesian formats are a polar format, a 360-degrees canvas format, a screen space format, or similar. In the 360-degrees canvas format, the given image is considered to lie on a surface of a sphere, and the colour data and the alpha data of the given image are expressed accordingly. Advantageously, utilization of the non-cartesian format helps in preserving directionality of the colour values and/or the alpha values, thereby improving quality of the compression of the colour data and the alpha data, respectively. In simpler terms, the non-cartesian format enables in retaining an image quality of the given image upon encoding.

Furthermore, optionally, the processor is configured to obtain a pose channel of the given image, the pose channel being indicative of a given pose of a given user's head or of a given device from a perspective of which the given image is generated, wherein when encoding, the processor is configured to:
detect whether there exists any previous image generated from a perspective of a previous pose that lies within a predefined angle from the given pose;
when it is detected that there exists a previous image generated from a perspective of a previous pose that lies within the predefined angle from the given pose:
reproject the previous image from the previous pose to the given pose;
determine whether at least one previous block of the previous image matches a given block of the given image, based on matching of alpha values in the given block of the given image with alpha values in the reprojected at least one previous block of the reprojected previous image; and
when it is determined that at least one previous block of the previous image matches the given block of the given image, include in the encoded data:
a reference to previous encoded data of the at least one previous block of the previous image for the given block of the given image, and
information indicative of at least one of: a position of the given block in the given image, a relative position of the given block with respect to the at least one previous block, a rotation to be applied, a scaling to be applied.

In this regard, the pose channel comprises pose data corresponding to the given image. The term "pose" encompasses a position and an orientation. The given pose of the given user's head or of the given device is determined with respect to a reference coordinate system in a 3-dimensional (3D) space. Optionally, the 3D space corresponds to a 3D extended reality (XR) environment. Optionally, the given pose of the given user's head or of the given device is determined using a pose-tracking means. The pose-tracking means could be implemented as an internal component of the device worn by the user or the given device, as a tracking system external to the device worn by the user or the given device, or as a combination thereof. The pose-tracking means could be implemented as at least one of: an optics-based tracking system, an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system. In an example, the given pose of the given user's head is determined by tracking a pose of a wearable device worn by the given user on his/her head. In this case, the pose of the wearable device corresponds to the pose of the given user's head. Examples of the device could be an extended-reality (XR) headset, a pair of XR glasses, and the like. Further, examples of the given device could be a tablet, a laptop, a desktop computer, a camera, or similar. Optionally, the encoder is implemented at the given device, or the wearable device worn by the given user.

As the processor receives a sequence of images, the processor has access to at least one previous image of the given image. Optionally, the processor is configured to analyse pose channel data of the at least one previous image to detect whether there exists any previous image, which is generated from the perspective of the previous pose that lies within the predefined angle from the given pose. When the previous pose lies within the predefined angle from the given pose, it indicates that the previous pose is similar to the given pose, and therefore the previous image generated from the perspective of the previous pose would represent similar visual content as the given image. Therefore, previous encoded data of such a previous image can beneficially be utilized while encoding the given image, so as to reduce a computational complexity, time, and burden on the processor.

Advantageously, the technical effect of determining the previous pose lying within the predefined angle from the given pose is that the alpha values of the previous image and the given image can be instantly compared in the same 3-D space. The predefined angle is selected such that fields of view (FOVs) of the given image and the previous image overlap at least partially. Optionally, the predefined angle lies in a range of 5 degrees to 30 degrees.

To "reproject" an image from a first pose to a second pose refers to changing a perspective with which data of the image is represented, from the first pose to the second pose. In simpler terms, a perspective of the image is changed from the first pose to the second pose. Said reprojection is performed to compensate any motion that would have occurred between the previous image and the given image. Optionally, the reprojection is applied using at least one reprojection algorithm. The at least one reprojection algorithm comprises at least space-warping algorithm. Image reprojection algorithms are well-known in the art. Upon reprojection, both the reprojected previous image and the given image represent a same perspective of the 3D space, and therefore their matching blocks can be identified accurately.

In this regard, upon reprojecting the previous image, the alpha values of reprojected previous blocks of the reprojected previous image are matched with the alpha values of corresponding blocks of the given image. This allows for a fast and efficient matching between the given block and the at least one previous block, whilst reducing the processing requirements of the encoder significantly. By "matching alpha values", it is meant that a manner in which alpha values are changing in the given block is similar to a manner in which alpha values are changing in the at least one previous block, in addition to having similar alpha values. It will be appreciated that during matching, alpha values that represent opaque objects are of greater significance, as they allow for accurate matching. Optionally, in this regard, alpha edges in the reprojected previous image are matched with alpha edges in the given image. The term "alpha edge" refers to an edge in a given image about which the alpha values of the pixels indicate a noticeable difference in transparency of the pixels. An alpha edge can accurately capture changes in the alpha values of pixels as the alpha values of the pixels vary significantly on either side of the alpha edge. It will be appreciated that an alpha edge is representative of a boundary of an object, and therefore, alpha values on an alpha edge abruptly change to zero (full transparency) on the other side of the alpha edge.

Additionally, optionally, upon reprojecting the previous image, the colour values of the colour channels and the data values of the at least one other channel of the remaining portion of the given image are matched with the colour values and the data values of a corresponding portion of the reprojected previous image. This allows for a best possible matching between the given block and the at least one previous block.

Moreover, upon reprojecting the previous image, missing data values in the reprojected previous image may be generated using suitable image processing techniques (for example, such as inpainting technique, interpolation technique, extrapolation technique, or similar). Beneficially, reprojecting the previous image from the previous pose to the given pose enables in accurate matching of the at least one previous block with the given block from a same perspective, i.e., the perspective of the given pose.

Optionally, the reference to the previous encoded data is in a form of at least one of: pointer pointing to the previous encoded data in a stream of the encoded data, a unique identification of the previous encoded data. Including the reference to the previous encoded data of the at least one previous block in the encoded data allows a decoder to access the previous encoded data of the at least one previous block, thereby enabling the decoder to first decode the previous encoded data into a corresponding decoded block and then reproject the corresponding decoded block from the previous pose to the given pose to generate a corresponding re-created block, so as to recreate the data of the given block of the given image.

Optionally, the aforesaid information included in the encoded data is indicative of the position of the given block in the given image. In this regard, the position of the given block is included so as to accurately position a re-created block corresponding to the given block in the given decoded image, at the time of decoding.

Optionally, said information included in the encoded data is indicative of the relative position of the given block with respect to the at least one previous block. This relative position is provided to accurately re-project the corresponding decoded block of the at least one previous block at the time of decoding and to also enable accurate positioning of the re-created block in the given decoded image.

Optionally, the information included in the encoded data is indicative of the rotation to be applied. In this regard, data of the at least one previous block may be represented from a perspective that is different from a perspective with which data of the given block is represented. In order to compensate for an angular difference between said perspectives, the corresponding decoded block of the at least one previous block may be rotated to obtain the re-created block corresponding to the given block, at the time of decoding. The angular difference between said perspectives is an angular difference between the given pose and the previous pose, and such a compensation is a motion compensation between the given image and the previous image. The rotation to be applied is specified in terms of its magnitude and direction, which enables in accurately re-creating the given block.

Optionally, the information included in the encoded data is indicative of the scaling to be applied. In this regard, the term "scaling" encompasses downscaling and/or upscaling of the corresponding decoded block of the at least one previous block. Optionally, in this regard, data of the corresponding decoded block is scaled to match a scale of the given block to obtain the re-created block corresponding to the given block at the time of decoding.

Optionally, the processor is configured to obtain a pose channel of the given image, the pose channel being indicative of a given pose of a given user's head or of a given device from a perspective of which the given image is generated,
  wherein when encoding, the processor is configured to:
    detect whether there exists any previous image generated from a perspective of a previous pose that lies within a predefined angle from the given pose;
    when it is detected that there exists a previous image generated from a perspective of a previous pose that lies within the predefined angle from the given pose: reproject the given image from the given pose to the previous pose;
    determine whether at least one previous block of the previous image matches a given block of the given image, based on matching of alpha values in the reprojected given block of the reprojected given image with alpha values in the at least one previous block of the previous image; and
    when it is determined that at least one previous block of the previous image matches the given block of the given image, include in the encoded data:
      a reference to previous encoded data of the at least one previous block of the previous image for the given block of the given image, and
      information indicative of at least one of: a position of the given block in the given image, a relative position of the given block with respect to the at least one previous block, a rotation to be applied, a scaling to be applied.

In this regard, the perspective of the given image is changed from the given pose to the previous pose. Upon reprojecting the given image, the alpha values of the remaining portion of the reprojected given image are matched with the alpha values of a corresponding portion of the previous image. This allows for a fast and efficient matching between the given block and the at least one previous block, whilst reducing the processing requirements of the encoder significantly. Optionally, in this regard, alpha edges in the reprojected given image are matched with alpha edges in the previous image.

Additionally, optionally, upon reprojecting the given image, the colour values of the colour channels and optionally, the data values of the at least one other channel of the remaining portion of the reprojected given image are matched with the colour values and the data values of a corresponding portion of the previous image. This allows for a best possible matching between the given block and the at least one previous block. Moreover, upon reprojecting the given image, missing alpha values in the reprojected given image may be generated using suitable image processing techniques (for example, such as inpainting technique, interpolation technique, extrapolation technique, or similar). Beneficially, reprojecting the given image from the given pose to the previous pose enables in accurate matching of the given block with the at least one previous block from a same perspective, i.e., the perspective of the previous pose.

Optionally, the alpha values are said to be matching, when there is an exact match or near-exact match (for example, +/−5 percent difference from each other).

Optionally, when encoding, the processor is configured to encode the given block of the given image as anew in the encoded data, when it is determined that no previous block of any previous image matches the given block of the given image. When no previous block of any previous image matches the given block of the given image, the previously encoded data of said previous image cannot be utilized for computational resource savings and time-efficiency during encoding by the processor. Therefore, the processor encodes the given block from scratch. The encoded data of the given block of the given image (encoded as anew) could beneficially be usable later for encoding corresponding block(s) of subsequent images.

Furthermore, optionally, the at least one other channel further comprises a gaze channel indicative of a gaze direction of a given user's eyes. The term "gaze direction" refers to a direction in which the given user's eyes are gazing. The gaze direction may be represented by a gaze vector. Optionally, the gaze direction of the given user's eyes is tracked by a gaze-tracking means. The gaze-tracking means may be implemented in the device associated with the given user, as contact lenses with sensors, cameras monitoring a position, a size and/or a shape of a pupil of a given eye of the user, and the like. Such gaze-tracking means are well known in the art.

Moreover, optionally, the processor is also configured to correlate the colour data and the alpha data of a left image and a right image to be viewed by a left eye and a right eye, respectively. Owing to an overlap between FOVs of the left eye and the right eye, the encoded data of the left image can be efficiently used for encoding the right image, or vice versa. As an example, an encoded data of a given block of the left image can be utilised for a corresponding block of the right image, as explained earlier with respect to the previous image and the given image.

Furthermore, optionally, when encoding, the processor is configured to apply respective channel-specific deblocking filters to the colour values on edges of the blocks of the colour data and the alpha values on edges of the blocks of the alpha data. In this regard, the term "deblocking filter" refers to a digital filter that is applied to the given image for smoothening sharp edges between blocks of different channels of the given image during encoding, to avoid formation of perceptible macro-blocks in the given decoded image generated upon decoding the encoded data. Examples of the channel-specific deblocking filters could be, Sample adaptive offset (SAO), Adaptive loop filter (ALF), and the like. Herein, different deblocking filters may be used for different channels of the given image. The channel-specific deblocking filters address characteristics of the specific channels of the given block of the given image, when processing the colour values on the edges of the blocks of the colour data and the alpha values on the edges of the blocks of the alpha data. These channel-specific deblocking filters are applied to the colour values of pixels along the edges of the blocks of the colour data and to the alpha values of pixels along the edges of the blocks of the alpha data. It will be appreciated that the channel-specific deblocking filter may also be used at the time of decoding. Advantageously, the channel-specific deblocking filters significantly improve visual quality of the re-created image.

Optionally, the processor is further configured to send the encoded data to the decoder. The term "decoder" refers to specialized equipment that, in operation, decodes the encoded data to yield the given decoded image. The given decoded image is a re-creation of the given image and can be understood to be a re-created image. The decoder provides the given decoded image to the given device from the perspective of which the given image is generated, or to the wearable device used by the user, or to another device. Optionally, the given device or the wearable device comprises the decoder. Examples of the another device could be, a display device, a data repository, a computing device, or similar. Beneficially, the encoded data is transmitted from the encoder to the decoder in a bandwidth-efficient manner. Optionally, when the given image is an XR image, the given decoded image is also an XR image. In such a case, a sequence of decoded images constitutes a visual scene of an XR environment. The decoder optionally executes a method for decoding images which is a converse of the aforesaid method for encoding images, to produce decoded images using encoded data of images that are encoded by the encoder.

Optionally, the decoder comprises a processor configured to execute the method for decoding images. The processor of the decoder is configured to:
  obtain the encoded data, wherein the encoded data comprises encoded colour data of the colour channels of the given image and encoded alpha data of the alpha channel of the given image;
  decode the encoded data to obtain decoded blocks of the given decoded image, wherein a given encoded block of the encoded colour data and a corresponding encoded block of the encoded alpha data are decoded together; and
  assemble the decoded blocks of the given decoded image to generate the given decoded image, wherein respective decoded blocks of the colour data and the alpha data are assembled respectively.

Optionally, the encoded data is transmitted from the encoder to the decoder as a bitstream. The processor of the decoder decodes the encoded data to generate the decoded blocks and combines the decoded blocks to generate the given decoded image. The given decoded image is re-creation of the given image.

The present disclosure also relates to the method for encoding images as described above. Various embodiments and variants disclosed above, with respect to the aforementioned first aspect, apply mutatis mutandis to the method for encoding images.

Optionally, the method further comprises obtaining a pose channel of the given image, the pose channel being indicative of a given pose of a given user's head or of a given device from a perspective of which the given image is generated, wherein the step of encoding comprises:
  detecting whether there exists any previous image generated from a perspective of a previous pose that lies within a predefined angle from the given pose;
  when it is detected that there exists a previous image generated from a perspective of a previous pose that lies within the predefined angle from the given pose:
    reprojecting the previous image from the previous pose to the given pose;
    determining whether at least one previous block of the previous image matches a given block of the given image, based on matching of alpha values in the given block of the given image with alpha values in the reprojected at least one previous block of the reprojected previous image; and
    when it is determined that at least one previous block of the previous image matches the given block of the given image, including in the encoded data:
      a reference to previous encoded data of the at least one previous block of the previous image for the given block of the given image, and
      information indicative of at least one of: a position of the given block in the given image, a relative position of the given block with respect to the at least one previous block, a rotation to be applied, a scaling to be applied.

Optionally, the method further comprises obtaining a pose channel of the given image, the pose channel being indicative of a given pose of a given user's head or of a given device from a perspective of which the given image is generated, wherein the step of encoding comprises:
  detecting whether there exists any previous image generated from a perspective of a previous pose that lies within a predefined angle from the given pose;
  when it is detected that there exists a previous image generated from a perspective of a previous pose that lies within the predefined angle from the given pose:
    reprojecting the given image from the given pose to the previous pose;
    determining whether at least one previous block of the previous image matches a given block of the given image, based on matching of alpha values in the reprojected given block of the reprojected given image with alpha values in the at least one previous block of the previous image; and
    when it is determined that at least one previous block of the previous image matches the given block of the given image, including in the encoded data:
      a reference to previous encoded data of the at least one previous block of the previous image for the given block of the given image, and
      information indicative of at least one of: a position of the given block in the given image, a relative position of the given block with respect to the at least one previous block, a rotation to be applied, a scaling to be applied.

Optionally, the step of encoding comprises encoding the given block of the given image as anew in the encoded data, when it is determined that no previous block of any previous image matches the given block of the given image.

Optionally, the step of dividing comprises determining how the colour data of the remaining portion is to be divided into its respective blocks, based on how the alpha data of the remaining portion is divided into its respective blocks.

Optionally, the given image is divided into the blocks in a hierarchical manner, based on at least one of:
- a dynamic range of at least one of: the colour values, the alpha values in the blocks,
- a manner in which at least one of: colour values, alpha values change in the blocks.

Optionally, the blocks of the colour data and the blocks of the alpha data are at a same level of division depth.

Alternatively, optionally, the step of dividing comprises:
initially dividing the colour data and the alpha data into respective blocks at a same level of division depth; and
further dividing at least one block of the colour data into smaller blocks, based on a dynamic range of colour values in the at least one block of the colour data.

Optionally, the step of dividing comprises:
initially dividing the colour data and the alpha data into respective blocks at a same level of division depth; and
further dividing at least one block of the alpha data into smaller blocks, based on a dynamic range of alpha values in the at least one block of the alpha data.

DETAILED DESCRIPTION OF THE DRAWINGS

Figure 1:
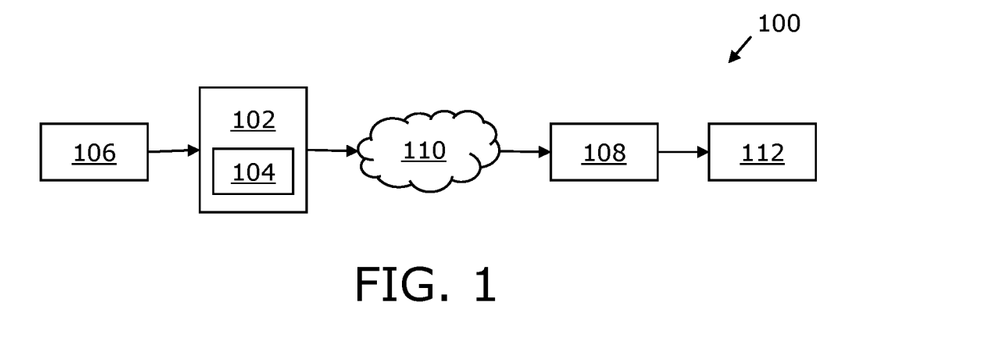
FIG. 1 is a schematic illustration of an exemplary environment in which an encoder for encoding images is in use, in accordance with an embodiment of the present disclosure.

Referring to FIG. 1, illustrated is a schematic illustration of an exemplary environment 100 in which an encoder 102 for encoding images is in use, in accordance with an embodiment of the present disclosure. The encoder 102 comprises a processor 104. The images to be encoded are received by the encoder 102 from an image source 106. The encoder 102, in use, encodes the images to generate encoded data. The encoded data is sent by the encoder 102 to a decoder 108, via a communication network 110. The decoder 108, in use, decodes the encoded data to generate a decoded image. The decoder 108 provides the decoded image to a device 112. The device 112 could, for example, be a wearable device, another display device, a data repository, a computing device, or similar. FIG. 1 is merely an example, which should not unduly limit the scope of the claims herein. The person skilled in the art will recognize many variations, alternatives, and modifications of embodiments of the present disclosure.

Figure 2:
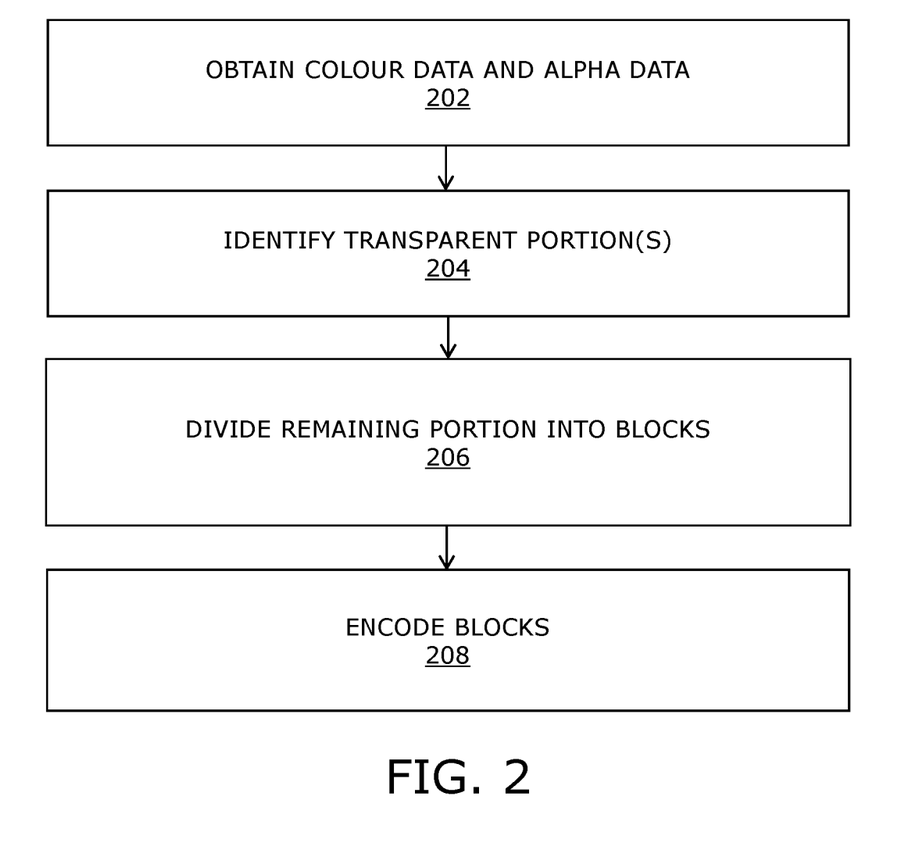
FIG. 2 illustrates steps of a method for encoding images, in accordance with an embodiment of the present disclosure.

Referring to FIG. 2, illustrated are steps of a method for encoding images, in accordance with an embodiment of the present disclosure. At step 202, colour data of colour channels of a given image and alpha data of an alpha channel of the given image are obtained. At step 204, at least one portion of the given image whose alpha values are zero or less than a predefined threshold value is identified, wherein a zero alpha value represents full transparency. At step 206, a remaining portion of the given image is divided into blocks, wherein the colour data and the alpha data of the remaining portion are divided into their own respective blocks. At step 208, the blocks are encoded into encoded data. The aforementioned steps are only illustrative and other alternatives can also be provided where one or more steps are added, one or more steps are removed, or one or more steps are provided in a different sequence without departing from the scope of the claims herein.

Figure 3A:
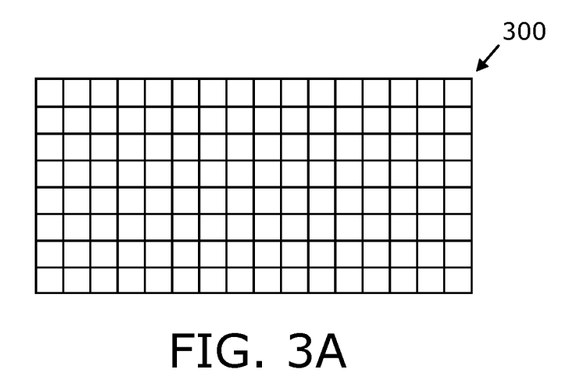
FIG. 3A illustrates a given image that is to be encoded.
Figure 3B:
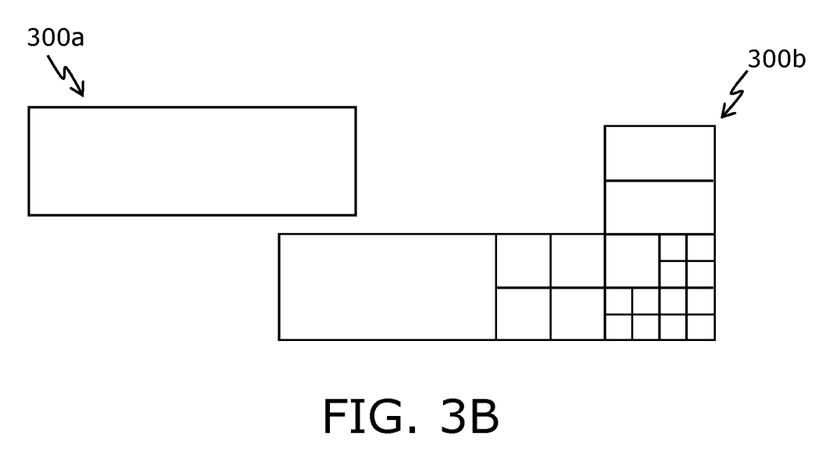
Figure 3C:
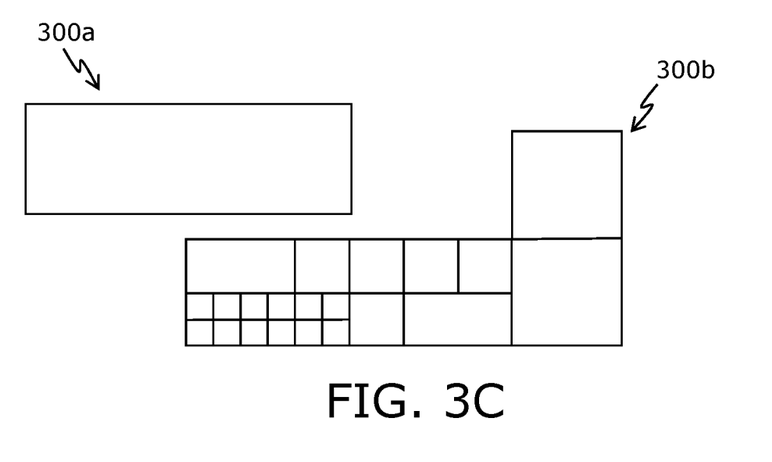
FIG. 3C illustrates the portion of the given image whose alpha values are zero or less than the predefined threshold value and the remaining portion of the given image whose alpha data is divided into blocks, in accordance with an embodiment of the present disclosure.

Referring to FIGS. 3A, 3B and 3C, FIG. 3A illustrates a given image 300 that is to be encoded, FIG. 3B illustrates a portion 300a of the given image 300 whose alpha values are zero or less than a predefined threshold value and how colour data of a remaining portion 300b of the given image 300 is divided into blocks, while FIG. 3C illustrates the portion 300a whose alpha values are zero or less than the predefined threshold value and how alpha data of the remaining portion 300b is divided into blocks, in accordance with an embodiment of the present disclosure.

In FIG. 3A, the given image 300 is shown to comprise a plurality of pixels (depicted for example as 128 groups of neighbouring pixels arranged as an 8×16 grid, for sake of convenience only, wherein each group comprises N×N pixels). The remaining portion 300b of the given image 300 is divided into blocks, wherein the colour data and the alpha data are divided into their own respective blocks. Optionally, such division is performed in a hierarchical manner, based on at least one of: a dynamic range of at least one of: the colour values, the alpha values in the blocks, a manner in which at least one of: colour values, alpha values change in the blocks.

In FIG. 3B, the portion 300a of the given image 300 is identified and the colour data of the remaining portion 300b is divided into blocks. The portion 300a has alpha values equal to zero or less than a predefined threshold value. The colour data of the remaining portion 300b of the given image 300 is shown to be divided into 20 blocks of different sizes (depicted, for example as 1 block of 4×8 groups of pixels, 2 blocks of 2×4 groups of pixels each, 5 blocks of 2×2 groups of pixels each, and 12 blocks of 1 group of pixels each). In FIG. 3C, the alpha data of the remaining portion 300b is shown to be divided into 21 blocks of different sizes (depicted, for example as 2 blocks of 4×4 groups of pixels, 2 blocks of 2×4 groups of pixels each, 5 blocks of 2×2 groups of pixels each, and 12 blocks of 1 group of pixels each).

With reference to FIGS. 3B and 3C, the blocks of the colour data and the blocks of the alpha data are at different levels of division depth at different portions of the given image 300. FIGS. 3A-3C are merely examples, which should not unduly limit the scope of the claims herein. The person skilled in the art will recognize many variations, alternatives, and modifications of embodiments of the present disclosure. For example, the colour data and the alpha data may be divided into a same number of blocks having a same size.

Figure 4:
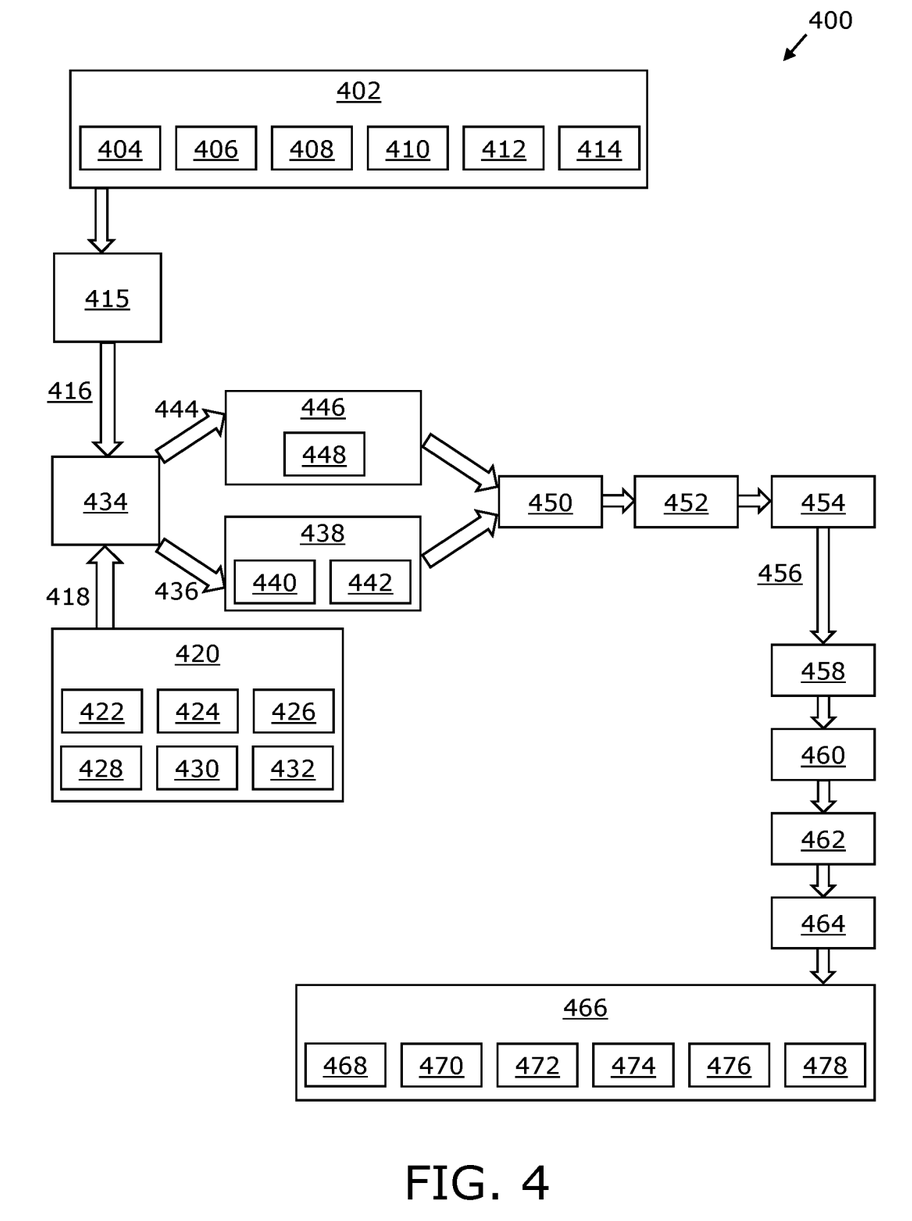
FIG. 4 illustrates an exemplary detailed end-to-end process flow of operation of an encoder and a decoder, in accordance with an embodiment of the present disclosure.

Referring to FIG. 4, illustrated is an exemplary detailed end-to-end process flow 400 of operation of an encoder and a decoder, in accordance with an embodiment of the present disclosure. Data 402 pertaining to a given image is obtained at an input interface of an encoder, wherein the data 402 comprises colour data 404 of colour channels of the given image and alpha data 406 of an alpha channel of the given image. In addition to the colour data 404 and the alpha data 406, the data 402 optionally comprises other data. The other data comprises, for example, at least one of: depth data 408 of a depth channel of the given image, velocity data 410 of a velocity channel of the given image, pose data 412 of a pose channel of the given image, and gaze data 414 of a gaze channel of the given image.

At 415, at least one portion of the given image having alpha values zero or less than a predefined threshold value is identified. A portion other than the at least one portion of the given image is a remaining portion of the given image. The remaining portion obtained at this step is processed further as described below.

At 416, the remaining portion of the given image is divided into blocks, the colour data and the alpha data are divided into their own respective blocks. At 418, historical data 420 pertaining to a previous image is obtained. The historical data 420 comprises historical colour data 422 and historical alpha data 424 of the previous image. In addition to the historical colour data 422 and the historical alpha data 424, the historical data 420 optionally comprises historical other data. The historical other data comprise, for example, at least one of: historical depth data 426, historical velocity data 428, historical pose data 430, and historical gaze data 432, of the previous image.

At 434, it is determined whether at least one previous block of the previous image matches a given block of the given image. When said matching is determined to occur at 436, inter-compression 438 is performed by including in encoded data: a reference 440 to previous encoded data of the at least one previous block of the previous image for the given block of the given image, and information 442 indicative of at least one of: a position of the given block in the given image, a relative position of the given block with respect to the at least one previous block, a rotation to be applied, a scaling to be applied. When said matching is determined to not occur at 444, intra-compression 446 is performed by encoding the given block of the given image as anew in encoded data. In this regard, at 448, the given block is further divided into blocks of smaller size.

At 450, the blocks (into which the remaining portion of the given image is divided) are compressed. At 452, respective channel-specific deblocking filters are applied to colour values on edges of the blocks of the colour data and alpha values on edges of the blocks of the alpha data. At 454, the compressed data is entropy coded. Steps 450, 452, and 454 collectively constitute encoding of the blocks into the encoded data.

The encoded data is sent, for example, as a bitstream 456, from the encoder to the decoder. At 458, the encoded data is entropy decoded. At 460, the encoded data is de-compressed. At 462, the blocks are re-created. At 464, the given image is re-created. Steps 458, 460, 462, and 464 collectively constitute decoding of the encoded data into a re-creation of the given image (hereinafter referred to as a re-created image or a decoded image interchangeably, throughout the present disclosure).

Data 466 pertaining to the re-created image is generated at an output interface of the decoder, wherein the data 466 comprises colour data 468 of colour channels of the re-created image and alpha data 470 of alpha channel of the re-created image. In addition to the colour data 468 and the alpha data 470, the data 466 optionally comprises other data. The other data comprises, for example, at least one of: depth data 472, velocity data 474, pose data 476, and gaze data 478, of the re-created image.

FIG. 4 is merely an example, which should not unduly limit the scope of the claims herein. The person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An encoder for encoding images, the encoder comprising a processor configured to:
obtain colour data of colour channels of a given image and alpha data of an alpha channel of the given image;
identify at least one portion of the given image whose alpha values are zero or less than a predefined threshold value, wherein a zero alpha value indicates full transparency;
divide a remaining portion of the given image into blocks, wherein the colour data and the alpha data of the remaining portion are divided into their own respective blocks; and
encode the blocks into encoded data;
wherein the given image is divided into the blocks in a hierarchical manner, based on at least one of:
a dynamic range of at least one of: the colour values, the alpha values in the blocks,
a manner in which at least one of: colour values, alpha values change in the blocks,
wherein when dividing, the processor is configured to:
initially divide the colour data and the alpha data into respective blocks at a same level of division depth; and
further divide at least one block of the alpha data into smaller blocks, based on a dynamic range of alpha values in the at least one block of the alpha data.

2. The encoder of claim 1, wherein a given block of the colour data and a corresponding block of the alpha data are encoded together into the encoded data.

3. The encoder of claim 1, wherein for alpha values ranging from 0 to 1, the predefined threshold value lies in a range of 0 to 0.1.

4. The encoder of claim 1, wherein the processor is configured to obtain a pose channel of the given image, the pose channel being indicative of a given pose of a given user's head or of a given device from a perspective of which the given image is generated,
wherein when encoding, the processor is configured to:
detect whether there exists any previous image generated from a perspective of a previous pose that lies within a predefined angle from the given pose;
when it is detected that there exists a previous image generated from a perspective of a previous pose that lies within the predefined angle from the given pose:
reproject the previous image from the previous pose to the given pose;
determine whether at least one previous block of the previous image matches a given block of the given image, based on matching of alpha values in the given block of the given image with alpha values in the reprojected at least one previous block of the reprojected previous image; and
when it is determined that at least one previous block of the previous image matches the given block of the given image, include in the encoded data:
a reference to previous encoded data of the at least one previous block of the previous image for the given block of the given image, and
information indicative of at least one of: a position of the given block in the given image, a relative position of the given block with respect to the at least one previous block, a rotation to be applied, a scaling to be applied.

5. The encoder of claim 1, wherein the processor is configured to obtain a pose channel of the given image, the pose channel being indicative of a given pose of a given user's head or of a given device from a perspective of which the given image is generated, wherein when encoding, the processor is configured to:
detect whether there exists any previous image generated from a perspective of a previous pose that lies within a predefined angle from the given pose;

when it is detected that there exists a previous image generated from a perspective of a previous pose that lies within the predefined angle from the given pose:

reproject the given image from the given pose to the previous pose;

determine whether at least one previous block of the previous image matches a given block of the given image, based on matching of alpha values in the reprojected given block of the reprojected given image with alpha values in the at least one previous block of the previous image; and when it is determined that at least one previous block of the previous image matches the given block of the given image, include in the encoded data:

a reference to previous encoded data of the at least one previous block of the previous image for the given block of the given image, and information indicative of at least one of: a position of the given block in the given image, a relative position of the given block with respect to the at least one previous block, a rotation to be applied, a scaling to be applied.

6. The encoder of claim 4, wherein when encoding, the processor is configured to encode the given block of the given image as anew in the encoded data, when it is determined that no previous block of any previous image matches the given block of the given image.

7. The encoder of claim 1, wherein when dividing, the processor is configured to determine how the colour data of the remaining portion is to be divided into its respective blocks, based on how the alpha data of the remaining portion is divided into its respective blocks.

8. The encoder of claim 1, wherein the blocks of the colour data and the blocks of the alpha data are at a same level of division depth.

9. The encoder of claim 1, wherein when dividing, the processor is configured to:

initially divide the colour data and the alpha data into respective blocks at a same level of division depth; and further divide at least one block of the colour data into smaller blocks, based on a dynamic range of colour values in the at least one block of the colour data.

10. The encoder of claim 1, wherein the processor is configured to obtain other data of at least one other channel of the given image, the at least one other channel comprising at least one of: a depth channel, a velocity channel, a surface normal channel, an object identifier channel, a material identifier channel, a specular channel of the given image, wherein the other data of the remaining portion is divided into its own respective blocks.

11. A method of encoding images, the method comprising:

obtaining colour data of colour channels of a given image and alpha data of an alpha channel of the given image;

identifying at least one portion of the given image whose alpha values are zero or less than a predefined threshold value, wherein a zero alpha value indicates full transparency;

dividing a remaining portion of the given image into blocks, wherein the colour data and the alpha data of the remaining portion are divided into their own respective blocks; and encoding the blocks into encoded data;

wherein the given image is divided into the blocks in a hierarchical manner, based on at least one of:

a dynamic range of at least one of: the colour values, the alpha values in the blocks, a manner in which at least one of: colour values, alpha values change in the blocks;

wherein the step dividing comprises:

initially dividing the colour data and the alpha data into respective blocks at a same level of division depth; and further dividing at least one block of the alpha data into smaller blocks, based on a dynamic range of alpha values in the at least one block of the alpha data.

12. The method of claim 11, wherein a given block of the colour data and a corresponding block of the alpha data are encoded together into the encoded data.

13. The method of claim 11, wherein for alpha values ranging from 0 to 1, the predefined threshold value lies in a range of 0 to 0.1.

14. The method of claim 11, further comprising obtaining a pose channel of the given image, the pose channel being indicative of a given pose of a given user's head or of a given device from a perspective of which the given image is generated, wherein the step of encoding comprises:

detecting whether there exists any previous image generated from a perspective of a previous pose that lies within a predefined angle from the given pose;

when it is detected that there exists a previous image generated from a perspective of a previous pose that lies within the predefined angle from the given pose:

reprojecting the previous image from the previous pose to the given pose;

determining whether at least one previous block of the previous image matches a given block of the given image, based on matching of alpha values in the given block of the given image with alpha values in the reprojected at least one previous block of the reprojected previous image; and when it is determined that at least one previous block of the previous image matches the given block of the given image, including in the encoded data:

a reference to previous encoded data of the at least one previous block of the previous image for the given block of the given image, and information indicative of at least one of: a position of the given block in the given image, a relative position of the given block with respect to the at least one previous block, a rotation to be applied, a scaling to be applied.

15. The method of claim 11, further comprising obtaining a pose channel of the given image, the pose channel being indicative of a given pose of a given user's head or of a given device from a perspective of which the given image is generated, wherein the step of encoding comprises:

detecting whether there exists any previous image generated from a perspective of a previous pose that lies within a predefined angle from the given pose;

when it is detected that there exists a previous image generated from a perspective of a previous pose that lies within the predefined angle from the given pose:

reprojecting the given image from the given pose to the previous pose;

determining whether at least one previous block of the previous image matches a given block of the given image, based on matching of alpha values in the reprojected given block of the reprojected given image with alpha values in the at least one previous block of the previous image; and when it is determined that at least one previous block of the previous image matches the given block of the given image, including in the encoded data:
  a reference to previous encoded data of the at least one previous block of the previous image for the given block of the given image, and
  information indicative of at least one of: a position of the given block in the given image, a relative position of the given block with respect to the at least one previous block, a rotation to be applied, a scaling to be applied.

16. The method of claim 14, wherein the step of encoding comprises encoding the given block of the given image as anew in the encoded data, when it is determined that no previous block of any previous image matches the given block of the given image.

17. The method of claim 11, wherein the step of dividing comprises determining how the colour data of the remaining portion is to be divided into its respective blocks, based on how the alpha data of the remaining portion is divided into its respective blocks.

18. The method of claim 11, wherein the blocks of the colour data and the blocks of the alpha data are at a same level of division depth.

19. The method of claim 11, wherein the step of dividing comprises:
  initially dividing the colour data and the alpha data into respective blocks at a same level of division depth; and
  further dividing at least one block of the colour data into smaller blocks, based on a dynamic range of colour values in the at least one block of the colour data.

* * * * *